United States Patent [19]

Imai et al.

[11] Patent Number: 4,916,469

[45] Date of Patent: Apr. 10, 1990

[54] IMAGE-FORMING APPARATUS

[75] Inventors: Nobuhiro Imai, Kawasaki; Tadashi Ochiai, Ibaraki; Fumio Asano, Noda, all of Japan

[73] Assignee: Canon Kabushiki Kaisha, Tokyo, Japan

[21] Appl. No.: 401,153

[22] Filed: Aug. 31, 1989

[30] Foreign Application Priority Data

Sep. 1, 1988 [JP] Japan ................................ 63-216325

[51] Int. Cl.[4] ............................................ G01D 15/00

[52] U.S. Cl. ................................ 346/150; 346/160.1; 346/146

[58] Field of Search ..................... 346/150, 153, 160.1, 346/146

[56] References Cited

U.S. PATENT DOCUMENTS 3,069,681 12/1962 Sloan .................................. 346/160

4,547,787 10/1985 Kaneko et al. ...................... 346/160

*Primary Examiner*—Arthur G. Evans

*Attorney, Agent, or Firm*—Fitzpatrick, Cella, Harper & Scinto

[57] ABSTRACT

The image-forming apparatus comprises a first frame, a recording electrode with an image formation voltage applied thereto, a belt-like recording medium disposed facing the charging electrode and toner transporting means for supplying toner to a space between said recording electrode and recording medium. For the positioning of the belt-like recording medium with respect to the charging electrode, a second frame for movably supporting the recording medium is provided together with the recording electrode in the first frame. An recording medium feed member is urged against the second frame at a predetermined position thereof. Thus, the recording electrode and recording medium can be positioned relative to each other without need of any particular adjustment whenever the recording medium is replaced.

13 Claims, 6 Drawing Sheets

IMAGE-FORMING APPARATUS

BACKGROUND OF THE INVENTION

1. Field of the Invention

This invention relates to an image-forming apparatus for forming a visible image on a recording medium by causing developer to be electrostatically attached thereto and, more particularly, to a mechanism for positioning a recording medium feed member and a charging electrode relative to each other in such image-forming apparatus.

2. Related Background Art

Japanese Patent Laid-open No. 60-250429 discloses an apparatus, which can form an image on a recording medium by feeding the medium with drive means. In this apparatus, a visual image of an original is formed to an enlarged scale on a whiteboard film fed out from a roll by transferring ink from an ink ribbon onto the whiteboard film by a thermal head.

As a technique like that noted above, there is a so-called electronic blackboard, which uses a plastic film in the form of an endless belt as display medium for copying information formed thereon.

The whiteboard film or plastic film in the electronic blackboard has semi-permanent life. Therefore, there is neither any concept of replacing such film nor any disclosed technique for replacing the film.

However, in an image-forming apparatus, in which a visible image is formed on recording medium like an endless belt driven for excursion by drive means by causing developer to be attached electrostatically on the medium, the medium has a predetermined life. That is, replacement with a new recording medium is necessary when a predetermined number of image formation cycles is reached.

Further, in the image-forming apparatus noted above, the recording medium and recording electrode should be spaced apart by a stringently controlled distance.

As noted above, the recording medium in the image-forming apparatus noted above should be replaced when a predetermined number of image formation cycles is reached. To permit smooth replacement, the recording medium is loaded in a support frame which is hinged or pivoted to an image-forming apparatus housing, and for replacement the support frame is opened form the housing. Since the support frame is pivotable relative to the housing, however, it is difficult to maintain a fixed distance between the recording medium and recording electrode.

SUMMARY OF THE INVENTION

It is an object of the invention is to provide a mechanism for positioning a recording medium feed member, which can maintain a fixed distance between the recording medium and recording electrode when the support frame is mounted in the housing irrespective of rotation of the support frame.

To achieve the above object, there is provided an image-forming apparatus, which comprises a first frame, a recording electrode with an image formation voltage applied thereto, a belt-like recording medium facing the recording electrode and toner transporting means for supplying toner to a space between the charging electrode and recording medium. For the positioning of the belt-like recording medium with respect to the recording electrode, a second frame for movably supporting the recording medium is provided together with the recording electrode in the first frame such that a recording medium feed member is urged against the second frame at a predetermined position thereof. Thus, the recording electrode and recording medium can be positioned relative to each other without need of any particular adjustment whenever the recording medium is replaced.

DETAILED DESCRIPTION OF THE PREFERRED EMBODIMENT

Figure 1:
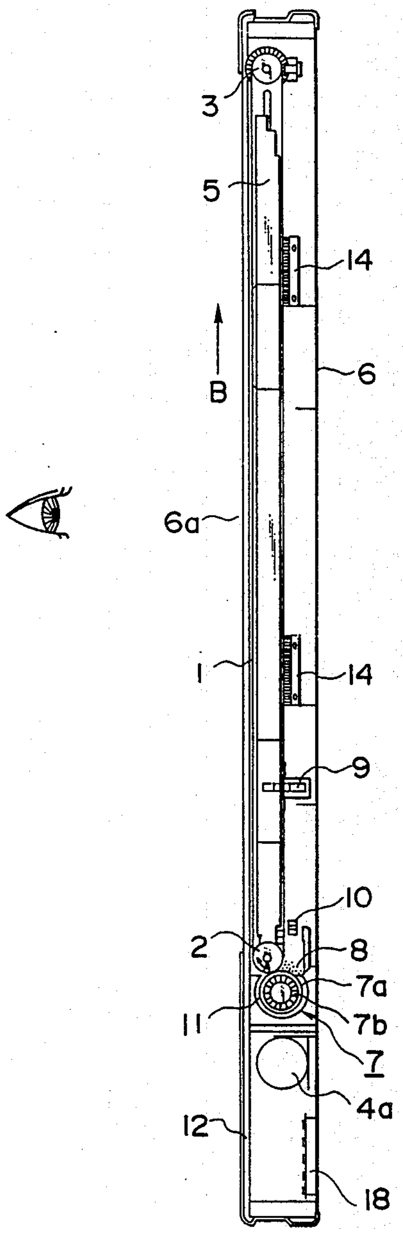
FIG. 1 is a sectional view showing an embodiment of the image-forming apparatus according to the invention.

Now, an embodiment of the image-forming apparatus according to the invention will be described.

The overall structure will now be described with reference to FIGS. 1 and 2, which are respectively a sectional and a schematic front view showing the image-forming apparatus. Referring to these Figures, reference numeral 1 designates an endless belt-like recording medium, which is passed round a drive roller 2 and a driven roller 3, which serve as feed members and are vertically spaced apart. The recording medium 1 is driven in the direction of arrow B with rotation of the drive roller 2 in the direction of arrow A caused by drive means 4. The drive and driven rollers 2 and 3 are supported by a support frame 5, which is mounted in a housing 6 having a display window 6*a*.

Developing means 7 for forming an image on the recording medium 1 is disposed beneath the drive roller 2. The developing means causes charging of a conductive magnetic developer (hereinafter referred to as "toner") according to image information and causes charged toner to be attached to the recording medium 1, thus forming an image thereon. A home position of the recording medium 1 driven in the direction of arrow B is detected by a home position sensor 9, and the image formed by the developing means 7 is displayed through the window 6*a*.

The image having passed by the window 6*a* with the movement of the recording medium 1 reaches cleaning means 10. In the cleaning means 10 the toner 8 attached to the recording medium 1 is removed to be recovered in a toner container 11.

The support frame 5 for supporting the recording medium 1 is movable with respect to the housing 6 so that the recording medium 1 can be replaced whenever image formation is effected a predetermined number of times.

Figure 2:
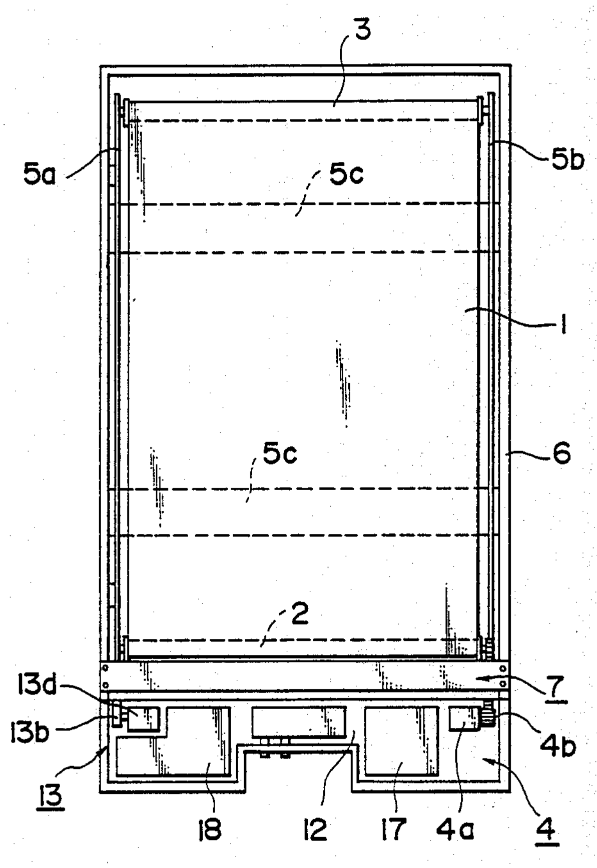
FIG. 2 is a schematic front view showing the same embodiment.

In the FIG. 1, reference numeral 14 designates conductive brushes in contact with a conductive layer in surface edge portions of the recording medium 1.

The structures of various parts will now be described in detail.

The recording medium 1 has a two-layer structure (not shown) consisting of an insulating layer facing the outer side of a track and a conductive layer facing the inner side of the track. The medium 1 is like an endless belt having substantially the same width as the window *6a*. It is passed around the drive and driven rollers 2 and 3 as noted above, and the drive means 4 is coupled to the drive roller 2.

Figure 3:
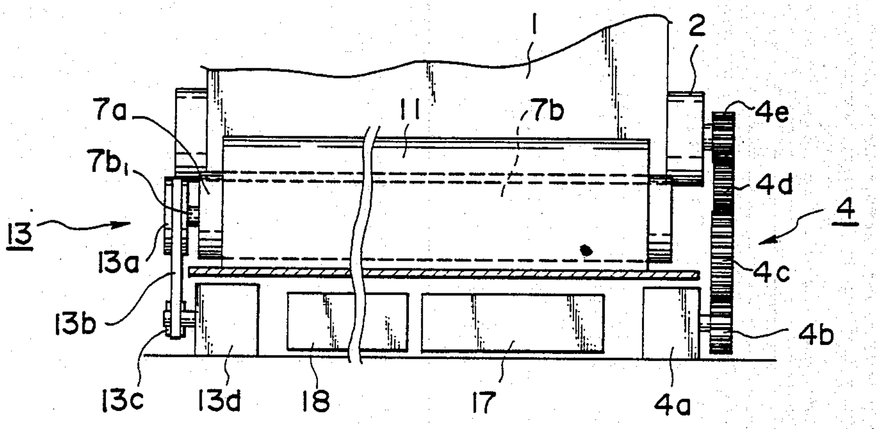
FIG. 3 is a view for explaining a structure for driving a printing sheet and a rotary magnet.

FIG. 3 shows the drive roller 2 in detail. In an electric fixture section 12 provided below developing means 7 a roller drive motor *4a* is provided for driving the drive roller 2. More specifically, a motor gear *4b* is secured to the shaft of the motor *4a* and is coupled via idler gears *4c* and *4d* to a roller gear *4e* secured to the shaft of the drive roller 2. The drive force of the motor *4a* is thus transmitted to the drive roller 2.

Figure 4:
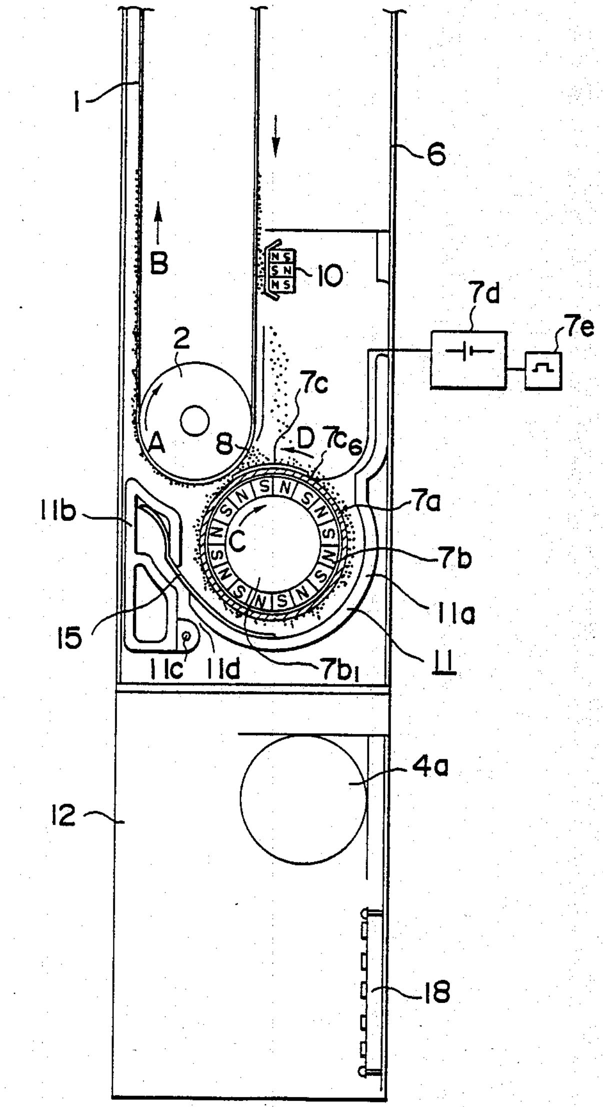
FIG. 4 is a view for explaining developing means.

In the developing means 7, as shown in FIG. 4, toner 8 is transported by developer transporting means including a non-magnetic cylindrical member *7a* and a rotary magnet *7b*. This toner 8 is charged according to image information by a charging electrode *7a* having a plurality of electrode members arranged in the width direction of the recording medium 1 to cause charged toner 8 to be attached to the recording medium 1.

To this end, the developer transporting means includes a cylindrical member *7a* of a non-magnetic material disposed in a toner container 11 and a rotary magnet *7b* accommodated in the cylindrical member *7a*. The cylindrical member *7a* has the opposite ends supported on a support 15 provided in the housing 6, and a shaft *7b1* of the rotary magnet *7b* is rotatably supported in the support 15.

The rotary magnet *7b* is coupled to drive means 13. Specifically, as shown in FIG. 3, a pulley *13a* is mounted on the shaft *7b1* of the rotary magnet *7b*. The pulley *13a* is coupled via a timing belt *13b* and a motor pulley *13c* to a magnet drive motor *13d* provided in the electric fixture section 12.

Thus, when the motor *13d* is driven, the rotary magnet *7b* is rotated in the direction of arrow C in FIG. 4. With this rotation of the magnet *7b*, toner 8 in the toner container 11 is transported along the surface of the cylindrical member *7a* in the direction of arrow D.

Figure 5A:
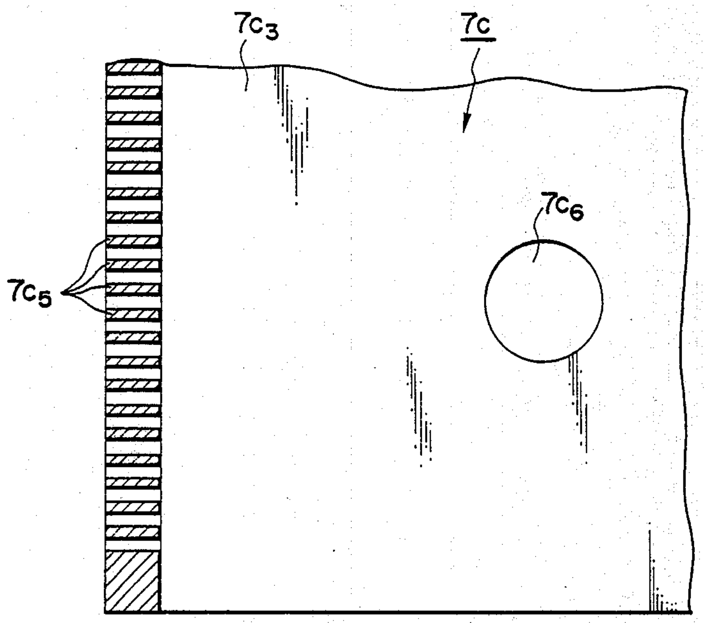
FIGS. 5A and 5B are views for explaining a printing electrode.
Figure 5B:
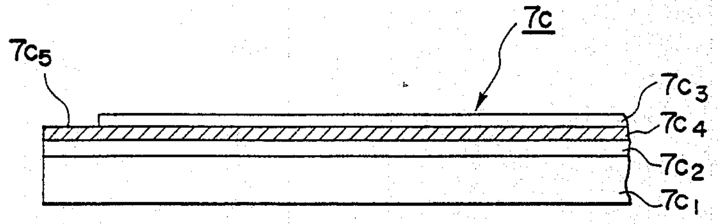

A recording electrode *7c* is provided on the surface of the cylindrical member *7a* at a position corresponding to the recording medium 1. This recording electrode *7c*, as shown in FIGS. 5A and 5B, includes a non-magnetic base member *7c1* consisting of an aluminum plate and a flexible printed circuit board bonded to the base member and having substantially the same width as the recording medium 1. The printed circuit board includes base films *7c2* and *7c3* made of polyimide resin or like material and a plurality of electrode members *7c4* consisting of a copper foil intervening between the base films. Each electrode member *7c4* has an exposed end portion serving as an electrode section *7c5*. The electrode section *7c5* faces the recording medium 1 at a small distance of 300 microns or below.

The recording electrode *7c* has a plurality of toner passage holes *7c6* arranged in a row extending in its width direction. Toner 8 transported along the surface of the cylindrical member *7a* is transported onto the electrode sections *7c5* through the holes *7c6*.

The electrode members *7c4* are connected to an image formation control member *7d* and an image input unit *7e*, which may be an image scanner or a computer.

In the above construction, when a voltage is applied to selected electrode sections *7c5*, toner 8 on the selected electrode sections *7c5* is charged. When the charged toner 8 contacts the recording medium 1 having an insulating surface layer, charge of the opposite polarity to the charge of the charged toner 8 is included in the conductive layer of the recording medium 1. As a result, the toner 8 is attached to the recording medium 1 to form a toner image.

Toner 8 on electrode sections *7c5*, to which no voltage is applied, is separated as unnecessary toner from the recording medium 1 by the transporting force of the rotary magnet *7b*. Thus, by applying a voltage selectively to the electrode sections *7c5* from the input unit *7e* according to image information, an image is formed on the recording medium 1.

The cleaning means 10 is disposed ahead of the developing means 7 in the direction of excursion of the recording medium 1. In this embodiment, the cleaning means is formed by disposing a magnet 10 at a predetermined distance from the surface of the recording medium 1.

As toner 8 attached to the recording medium 1 reaches the cleaning position noted above, it is attracted by the magnet 10 to form a toner pool or so called "toner brush" on the surface of the magnet 10. With this toner brush, toner 8 attached to the recording medium 1 is removed. The removed toner 8 falls for recovery into a lower toner container 11 to be used again.

The support frame 5 has opposite side vertical members *5a* and *5b* and horizontal members *5c* connecting the vertical members *5a* and *5b*. The vertical member *5a* is hinged to the housing 6, so that the support frame 5 is rotatable with respect to the housing 6.

The drive roller 2 as feed member is supported at the lower end of the support frame 5 rotatably and with a play provided in its radial direction. More particularly, end shafts *2a* and *2b* of the drive roller 2 are loosely fitted in and project from the vertical members *5a* and *5b*. Thus, when the drive roller 2 is merely supported in the support frame 5, its rattling is produced. The roller gear *4e* is secured to the end shaft *2b*, and drive force from the motor *4a* is transmitted to it.

In usual image formation, the support frame 5 is coupled to the housing 6. At this time, the end shafts *2a* and *2b* of the drive roller 2 are each accommodated in an accommodating section 16 formed in each of the vertical members *15a* and *15b* as upright sides of frame members constituting a first frame. Thus, the recording medium 1 passed round the drive roller 2 is held at a fixed distance from the charging electrode *7c*.

The cylindrical member *7a* with the recording electrode *7c* is mounted on the frame member 15 at a predetermined position thereof. The frame member 15 also rotatably supports the rotary magnet *7b* and is formed at positions spaced apart from the recording electrode *7c* with the accommodating section 16 for removably accommodating the drive roller 2 and engaging member 17.

The recording electrode *7c* is provided on the surface of the cylindrical member *7a*. The cylindrical member *7a* is mounted on the side member *15b* of the frame member 15 at a predetermined position thereof. The position, at which the cylindrical member *7a* is mounted on the side member *15b*, is set when designing the recording apparatus.

Thus, the position of the recording electrode *7c* is subject to variations depending on the position, at which the cylindrical member *7a* is mounted on the side member *15b*. For this reason, in this embodiment the accommodating section 16 for accommodating the drive roller 2 is set with reference to the recording electrode 7c set at a predetermined position of the frame member 15 by mounting the cylindrical member 7a on the side member 15b.

The accommodating sections 16 accommodate end shafts 2a and 2b of the drive roller 2 to rotatably support the roller 2. At the same time, they set the radial position of roller 2, thus setting a fixed distance between the recording medium 1 passed round the roller 2 and recording electrode 7c.

Figure 6A:
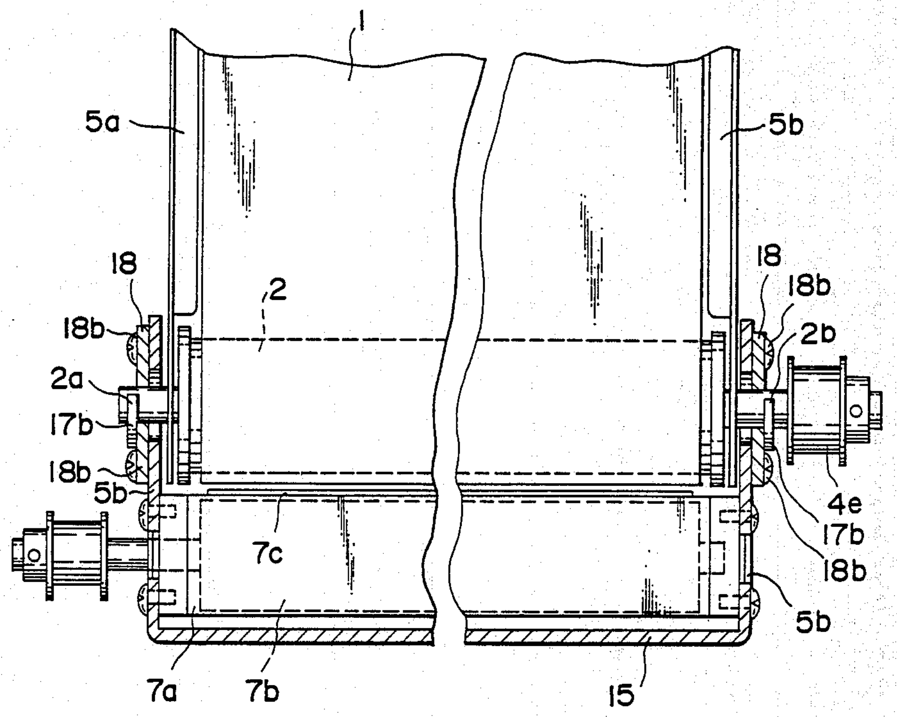
FIGS. 6A and 6B are views for explaining an accommodating section.
Figure 6B:
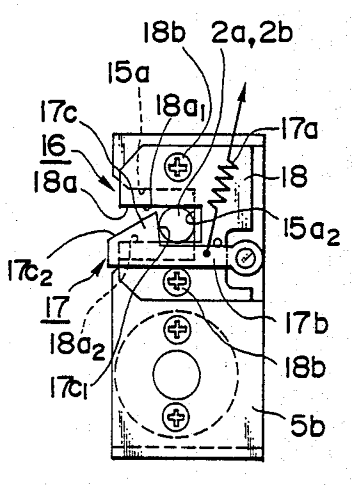

To this end, the accommodating section 16 is constituted, as shown in FIG. 6B, by a window 15a formed in the side member 15b of the frame member 15 and a regulating member 18 mounted in an overlapping relation to the window 15a and constituting a second frame.

The regulating member 18 has a groove 18a having a width equal to the diameter of the end shafts 2a and 2b of the drive roller 2. The regulating member 18 is secured to the side member 15b by a screw 18b passed through a slot (not shown) formed in the side member 15b to permit adjustment of the regulating member 18 in the vertical directions with respect to the frame member 15. The accommodating section 16 for accommodating each of the end shafts 2a and 2b of the drive roller is constituted by the upright side 15a1 of the window 15a of the side member 15b and vertical sides 18a1 and 18a2 of the groove 18a formed in the regulating member 18.

In the side member 15b of the frame member 15 is mounted a lever 17b upwardly biased by the spring 17a and serving as engaging member to engage the drive roller 2. The lever 17 has a projection 17c, the inner side 17c1 of which is spaced apart from the upright side 15a1 of the window 15a by a distance equal to the diameter of the end shafts 2a and 2b of the drive roller 2. The outer side 17c2 of the projection 17c constitutes a guide when inserting each of the end shafts 2a and 2b of the drive roller 2 in the accommodating section 16 and is formed as a gently curved surface.

With the engaging member constituted by the upwardly biased lever 17b, each of the end shafts 2a and 2b of the drive roller 2 accommodated in the accommodating section 16 can be locked without possibility of detachment from the accommodating section 16.

In the positioning mechanism for positioning the drive roller 2 described above, the procedure for adjusting the distance between the drive roller 2 and recording electrode 7c and setting the position of the drive roller 2 will now be described.

The cylindrical member 7a with the recording electrode 7c mounted thereon is secured to the side member 15b of the frame member 15. Then the drive roller 2, which is supported in the support frame 5, and round which the recording medium 1 is passed, is accommodated in the accommodating sections 16 of the frame members 15, and position of the regulating member 18 is determined by adjusting the distance between the recording medium 1 and recording electrode 7c using a gauge. When the distance noted above is adjusted, the regulating member 18 is coupled by the screw 18b to the side member 15b. Since the subject, in which the screw 18b is screwed, is the side member 15a supporting the center of rotation of the rotary magnet 7b integral with the recording electrode 7c, it is possible to improve the positional accuracy of the drive roller 2 with respect to the recording electrode 7c.

Once the distance between the recording medium 1 and recording electrode 7c is set in the above procedure, the roller 2 can be held in a fixed position of accommodation at all time even when the drive roller 2 is subsequently removed from the accommodating sections 16 of the frame members 15 for replacement of the recording medium 1.

In the above embodiment the accommodating section for accommodating the drive roller 2 is constituted by the window 15a formed in the frame member 15 and regulating member 18 provided in an overlapping relation to the window 15a. However, it is also possible to form the accommodating section with the sole window 15a. More specifically, if the cylindrical member 7a, recording electrode 7c, recording medium 1 and drive roller 2 are finished accurately to the designed sizes, by forming the window 15a such that its vertical dimension is equal to the diameter of the end shafts 2a and 2b of the drive roller 2, it is possible to maintain a fixed distance between the recording medium 1 and recording electrode 7c when each of the end shafts 2a and 2b of the drive roller 2 is accommodated in the window 15a.

The feed member rotatably supported in the support frame is rotatable with the support frame with respect to the housing. When causing engagement between the support frame and housing, the feed member is accommodated in the accommodating sections formed in the frame members provided in the housing. At this time, since the accommodating section is located at a position spaced apart by a predetermined distance from the recording electrode mounted in the frame member, it is possible to maintain a fixed distance between the axis of the feed member and recording electrode.

Thus, high quality of image can be obtained. In addition, there is no need of adjusting the distance between the recording medium and recording electrode whenever the recording medium is replaced. Further, it is possible to realize positioning of high reproducibility.

We claim:

1. An image-forming apparatus, comprising:

a first frame;

a recording electrode provided in said first frame, to which recording electrode voltage for recording is applied;

a belt-like recording medium disposed facing said recording electrode;

toner transporting means for supplying toner to a space between said recording electrode and recording medium;

a drive source for driving said recording medium;

a feed member for said recording for movably supporting said recording;

a second frame mounted on said first frame for movably supporting said feed member; and locking means for locking said feed member in said second frame at a predetermined position thereof;

whereby said charging electrode and recording medium are positioned relative to each other.

2. The image-forming apparatus according to claim 1, wherein said locking means effects positioning by urging said feed member in a predetermined direction.

3. The image-forming apparatus according to claim 1, further comprising an optical display window on a housing for displaying a toner image formed on said recording medium.

4. An image-forming apparatus, comprising:

a first frame;

a recording electrode provided in said first frame, to which recording electrode voltage for recording is applied;

a belt-like recording medium disposed facing said recording electrode and movable in vertical directions;

toner transporting means for supplying toner to a space between said recording electrode and recording medium;

a drive source for driving said recording medium;

a feed member for said recording medium for movably supporting a recording medium;

a second frame mounted in said frame for movably supporting said feed member; and locking means for locking said recording medium feed member in said second frame at a predetermined position thereof;

whereby said charging electrode and recording medium are positioned relative to each other.

5. The image-forming apparatus according to claim 4, further comprising an optical display window on a housing for displaying a toner image formed on said recording medium.

6. An image-forming apparatus, comprising:

a first frame;

a recording electrode provided in said first frame, to which recording electrode voltage for recording is applied;

a belt-like recording medium disposed facing said recording electrode and movable in vertical directions;

toner transporting means for supplying toner to a space between said charging electrode and recording medium;

a vessel for accommodating toner;

a drive source for driving said recording medium a feed member for the recording medium for movably supporting said recording medium;

a second frame mounted in said first frame and movably and removably supporting said feed member; and locking means for locking said feed member in said second frame at a predetermined position thereof;

whereby said charging electrode and recording medium are positioned relative to each other.

7. The image-forming apparatus according to claim 6, further comprising an optical display window on a housing for displaying a toner image formed on said recording medium.

8. The image-forming apparatus according to claim 6, wherein electric fixture means for driving said charging electrode is provided together with said drive source and power supply means beneath said toner vessel.

9. The image-forming apparatus according to claim 6, wherein said belt-like image-forming medium is passed for excursion around upper and lower rollers, and said drive source has a width substantially equal to the dimension of a shorter side of said toner vessel.

10. The image-forming apparatus according to claim 6, wherein said toner is magnetic and transported to said charging electrode by magnetic forces.

11. The image-forming apparatus, comprising:

a first frame;

a recording electrode provided in said first frame to which recording electrode voltage for recording is applied to said charging electrode;

a belt-like recording medium disposed facing said recording electrode;

toner transporting means for supplying toner by magnetic forces to a space between said recording electrode and recording medium;

a drive source for driving said recording medium;

a feed member for the recording medium for movably supporting said recording medium;

a second frame mounted in said first frame for movably supporting said feed member; and locking means for locking said recording medium feed member in said second frame at a predetermined position thereof;

whereby said recording electrode and recording medium are positioned relative to each other.

12. The image-forming apparatus according to claim 11, further comprising an optical display window of a housing for displaying a toner image formed on said recording medium.

13. The image-forming apparatus according to claim 1, wherein said locking means urges said feed member with elastic forces.

* * * * *

UNITED STATES PATENT AND TRADEMARK OFFICE

CERTIFICATE OF CORRECTION

PATENT NO. : 4,916,469

DATED : April 10, 1990

INVENTOR(S) : Imai et al.

It is certified that error appears in the above-identified patent and that said Letters Patent is hereby corrected as shown below:

ABSTRACT [57],
Line 10, change "An" to --A--.

COLUMN 1,
Line 47, change "form" to --from--.

COLUMN 4,
Line 21, change "so called" to --so-called--.

COLUMN 6,
Line 1, change "time" to --times--; and
Lines 49 and 50, change "recording" to --recording medium--.

COLUMN 7,
Line 35, change "medium" to --medium;--.

Signed and Sealed this

Tenth Day of September, 1991

*Attest:*

HARRY F. MANBECK, JR.

*Attesting Officer*

*Commissioner of Patents and Trademarks*